United States Patent Office 3,438,919
Patented Apr. 15, 1969

3,438,919
LUBRICATING COMPOSITION COMPRISING OLEIC ACID AND OLEYL ACID PHOSPHATE FOR POLYESTER RESINS
Martin S. Maltenfort, Newark, Del., assignor, by mesne assignments, to Koppers Company, Inc., Pittsburgh, Pa., a corporation of Delaware
No Drawing. Continuation-in-part of application Ser. No. 438,075, Mar. 8, 1965. This application Oct. 20, 1967, Ser. No. 676,702
Int. Cl. C08f 47/12, 45/10, 45/36
U.S. Cl. 260—22        2 Claims

ABSTRACT OF THE DISCLOSURE

A lubricating composition comprising oleic acid and oleyl acid phosphate is added to a polyester resin to lubricate the resin when the resin is used in the formation of fiber reinforced resin articles by the extraction technique. The lubricating composition does not deleteriously affect the finished article by the formation of voids and other surface defects such as are experienced with the use of other lubricating compositions.

BACKGROUND OF THE INVENTION

This invention relates to the production of fiber reinforced resin articles and to the formulation of resin materials particularly adapted for use in the formation of fiber reinforced resin articles by the extraction techniques, i.e., by the technique in which the resin impregnated fiber reinforcements are pulled through a forming passage and in which the resin is heated to effect solidification of the article. This application is a continuation-in-part of application Ser. No. 438,075, filed Mar. 8, 1965, now abandoned.

Techniques or operations of this kind and equipment for carrying out such operations are disclosed, for example, in copending application Ser. No. 115,633, filed June 8, 1961, and Patent No. 3,306,797, issued Feb. 28, 1967, both assigned to the assignee of the present application. As there disclosed, such an operation comprises impregnating the fiber reinforcement with a liquid heat settable or heat hardenable resin material, for instance by passing the reinforcements through a resin reservoir. The reinforcements are then drawn into and through a passage in a forming device, the passage having a portion substantially conforming with the shape of the article being made, and heat is applied so as to solidify the liquid resin in said portion of the forming passage. A puller mechanism is arranged at the delivery end of the forming passage, such puller mechanism comprising gripping the elements adapted to engage the solidified article beyond the delivery end of the forming passage, an example of such a puller mechanism being shown in the Boggs Patent No. 3,151,354, issued Oct. 6, 1964.

In operations of this kind various forms of glass fiber reinforcements are desirable used, and the impregnating resin material employed ordinarily comprises a solution of unsaturated polyester resin in a reactive unsaturated monomer, such as vinyl toluene. The resin is ordinarily formulated with certain other ingredients including a catalyst to initiate the reaction of the resin constituents. In addition fillers and pigment are quite frequently employed. Moreover certain lubricants have also been utilized in an effort to reduce the frictional resistance encountered by the puller mechanism as a result of the contact of the article being made with the surface or walls of the forming passage in the forming device. Certain of the friction developed has apparently been due to a tendency for the reactive monomer to polymerize on the surface of the forming passage, and develop adherent deposits of polymerized material with consequent increase in the coefficient of friction at the surface. Such deposits are also undesirable because they result in objectionable surface markings on the article being made.

In the case of articles of complex cross section, and especially where at least portions of the article are relatively thin, the friction encountered in drawing or pulling the article through and from the forming passage is so high in relation to the tensile strength of the reinforcements (especially when such reinforcements incorporate or consist of matted fibers, as is preferred, rather than woven fabrics or rovings alone) that breakage of the article tends to occur, thereby causing shutdowns.

Incorporation of lubricants in resin formulations has been resorted to in an effort to reduce the friction in the forming passage and thereby facilitate the pulling of the articles therefrom, and certain improvements in this direction have been achieved as a result of certain lubricants employed. However, in some formulations, some of the materials employed as lubricants, either because of the presence therein of volatile constituents or because of the presence therein of constituents which will react with other ingredients of the resin formulation to produce gaseous reaction products, have resulted in the development in the article being made of porosity or blisters, or in a tendency for the article to "foam" or develop many small voids within the solidified resin material. Although effects of this type are not always of serious consequences, depending upon the nature of the piece being made, nevertheless in general, it is desirable to eliminate such effects and is moreover exceedingly important to do so with certain types of articles, for example, in the case of tubular articles or pipe intended to be used in the handling of fluids and especially of gaseous materials. Porosity tends to develop leakage which, of course, is not tolerable when certain types of gaseous materials are to be handled in the tubular articles.

Moreover, tendency to develop voids is undesirable from an operational standpoint in the production of the articles. A difficulty encountered in this connection is that in the case of the making of a tubular article, the development of voids in the resin material tends to expand the thickness of the tube wall, and thereby abnormally increases the friction in the annular forming passage in which the article is solidified, thus causing increase in the resistance to the pulling of the solidified article from the discharge end of the forming passage. This in turn tends to cause breakage of the article being formed in the forming passage.

SUMMARY OF THE INVENTION

With the foregoing in mind, the present invention provides an improved resin formulation for operations or techniques of the kind referred to, which formulation not only provides improved lubrication, but which at the same time substantially overcomes tendency to develop voids, blisters, surface defects and porosity arising from the sources mentioned above. The improvement comprises the addition of a lubricating composition comprised of 0.5–5 parts oleic acid and 0.25–2.5 parts oleyl acid phosphate to the resin, the parts being parts by weight per 100 parts by weight of the total resin solution.

In consequence, the use of the lubricating composition of the invention in a resin formulation greatly reduces breakage and shutdowns and also greatly diminishes the pulling effort required to advance the article through the forming passage.

DETAILED DESCRIPTION

In a resin formulation according to the preferred practice of the invention, a combination of oleic acid and oleyl acid phosphate are employed. I have found that the oleic acid is an especially good lubricant for an operation of the kind referred to. Moreover, it appears that the oleyl acid phosphate tends to migrate to the metal surfaces in the forming passage and thereby acts to materially reduce the tendency for the reactive monomer to polymerize on the surface of the forming passage. While not all of the mechanism or reasons for the improvement may be fully understood, nevertheless, I have found that the combination of the oleic and the oleyl acid phosphate provides greatly improved results, as compared with the use of either one of them alone. Thus, while the oleic acid, even used by itself, contributes good lubricating properties, it is preferred to use oleyl acid phosphate along with the oleic acid.

In a typical formulation according to the present invention, the oleic acid and oleyl acid phosphate are added to a resin solution comprising 50 to 80% of unsaturated polyester resin in 50–20% of a reactive unsaturated monomer.

Unsaturated polyester resins are well known in the art. (See, for example, U.S. Patent 2,255,313 issued to Carleton Ellis.) The unsaturated polyester portion of the resin is a condensation polymer formed by polyesterifying dicarboxylic acids with dihydric alcohols. To provide unsaturation within the polyester, at least a portion of the dicarboxylic acid must contain alpha, beta-ethylenic unsaturation. Examples of such unsaturated dicarboxylic acids include maleic, fumaric acids as well as maleic anhydride. The remainder of the dicarboxylic acids are usually either saturated normal aliphatics such as adipic acid, succinic acid or the like, or aromatic diacids such as phthalic acid, isophthalic acid or the like, as well as their halogenated derivatives such as tetrochlorophthalic anhydride.

Examples of common dihydric alcohols used in the polyesterification are ethyleneg lycol, 1,2-propane diol (propylene glycol). When more flexibility is desired, the ether glycols, such as diethylene glycol, dipropylene glycol, or the like can be used as the dihydric alcohol. The cyclic glycols such as 1,4-cyclohexane diol or the adducts or reaction products of alkylene oxides with bis-phenol A are also well-known constituents of polyesterification products which may be used in the unsaturated polyester resin.

The dicarboxylic acids and dihydric alcohols are reacted together in approximately equimolar proportions to form a polyester. The average molecular weight of the polymer is most conveniently measured with respect to the acid end groups. A gram of the polyester is titrated with KOH and the number of milligrams of KOH necessary to neutralize the gram of the polyester is called the acid number of the polyester. Acid numbers below 100 usually signify polyesters having sufficient molecular weight to possess good physical properties. Therefore, the unsaturated polyesters useful in the invention are those possessing a molecular weight indicated by an acid number below about 100.

As mentioned above, the unsaturated polyesters are dissolved in a reactive unsaturated monomer such as styrene or vinyl toluene. The amount of monomer used generally is about 20–50% by weight of the total polyester resin. Illustrative of such reactive unsaturated monomers are styrene, alphamethyl styrene, chlorostyrene, vinyl toluene, divinyl benzene, and the like as well as diallyl phthalate and methyl methacrylate.

Such polyester resins are commercially available under trademarks such as, for example, Paraplex or Koplac or the like.

The unsaturated polyester resin is subsequently cured by copolymerization of the unsaturated polyester and the unsaturated monomer. Initiation of this copolymerization is usually effected by the use of a free radical generating catalyst such as, for example, a peroxide catalyst, although UV light radiation or the like are also less frequently used.

As commercially available, some of these resin materials may be of higher concentration than 50 to 80%, in which event additional monomer may be added to bring the solution to a concentration within the range indicated. A typical preferred concentration of the resin-monomer solution is one in which the resin constitutes about 70% and the monomer about 30%.

In a typical formulation, for each 100 parts resin-monomer solution, oleic acid is desirably used in an amount from 0.5 to 5 parts by weight of the solution, and the oleyl acid phosphate is desirably used in an amount from 0.25 to 2.5 parts by weight of the solution. It is preferred to maintain a ratio of approximately 2 to 1 of the oleic acid to the oleyl acid phosphate.

Although the oleic acid and oleyl acid phosphate may be employed in quantities in excess of those referred to above, such larger quantities do not contribute any further improvement. Indeed, in a typical preferred formulation, for each 100 parts of the resin-monomer solution, the oleic acid advantageously comprises about 0.8 part by weight and the oleyl acid phosphate about 0.4 part by weight.

Ordinarily a catalyst will also be present in the formulation, preferably an organic peroxide catalyst, such as, for example, benzoyl peroxide in an amount ranging from 0.5 to 4 parts by weight for each 100 parts of the resin-monomer solution.

Formulations conforming with the foregoing may be employed for a variety of purposes and have the advantages hereinabove explained. However, for many purposes, it is also desirable to include in the formulation a filler, which may be used in amounts running up to about 100 parts for each 100 parts of the resin-monomer solution. For most purposes, the amount of filler is desirably upwards about 10 parts by weight and most advantageously at least 50, but not over 80 parts by weight for each 100 parts of the resin-monomer solution. It is important in connection with the employment of fillers that they be such as to avoid reaction with other ingredients present to develop gaseous reaction products. Advantageously clay (comprising, for example, aluminum silicate) is employed as a filler, although certain other fillers such as silica may be used. ASP–400 clay is an example of a suitable aluminum silicate. Desirably the filler is finely comminuted, for instance, to a particle size of 5 to 75 microns.

Frequently, also it is advantageous to employ a pigment and here again care should be taken to avoid an overall formulation which would result in development of gaseous reaction products. However, a wide variety of pigments are available including, for example, iron oxide black, rutile titanium dioxide, antimony oxide and iron oxide brown.

It is to be noted that the oleic acid not only contributes good lubricating properties to the resin formulation, but also acts to reduce the viscosity of the formulation and this is desirable as it improves the action of the resin in wetting out the fiber reinforcements, facilitates pumping of the resin material and permits higher loading with fillers.

The invention will be more clearly understood by referring to the following examples.

Example I

A resin formulation as follows was prepared, all of the amounts indicated being parts by weight:

| | |
|---|---:|
| Polyester resin A[1] | 180.00 |
| Vinyl toluene | 16.70 |
| Silica (30 microns) | 100.00 |
| Iron oxide black | 0.50 |
| Rutile titanium dioxide | 6.00 |
| Benzoyl peroxide | 2.50 |
| Oleic acid | 2.50 |
| Oleyl acid phosphate | 1.25 |

[1] A conventional polyester resin made by condensing phthalic anhydride and maleic anhydride with propylene glycol having mole ratios of 2:3:5 and diluted to 61.5% solution in vinyl toluene.

The foregoing formulation was used to impregnate glass fiber reinforcements (including both glass fiber mats and rovings) in the production of tubes of about 5 inches diameter and 3/16 inch wall thickness, on an extraction machine, of the kind disclosed in the above-identified U.S. patent application 3,306,797. Tubes of good quality, substantially free of porosity, surface defects, etc., were produced, and the production was substantially uninterrupted for as much as several days at a time.

Example II

The following formulation was prepared and used in the same manner and with similar desirable results, as explained above with reference to Example I.

| | |
|---|---:|
| Polyester resin A | 185.00 |
| Vinyl toluene | 4.00 |
| ASP–400 clay | 100.00 |
| Rutile titanium dioxide | 3.33 |
| 50% iron oxide black in polyester resin | 4.00 |
| Benzoyl peroxide | 2.00 |
| Oleic acid | 2.66 |
| Oleyl acid phosphate | 1.33 |

Example III

A formulation of lower viscosity was also prepared as follows and was used in the manner of Example I, with similar results:

| | |
|---|---:|
| Polyester resin A | 161.00 |
| Polyester resin B[1] | 28.00 |
| ASP–400 clay | 100.00 |
| Rutile titanium dioxide | 3.33 |
| 50% iron oxide black in polyester resin | 4.00 |
| Lucidol ATC (50% benzoyl peroxide in tri-cresyl phosphate) | 3.80 |
| Oleic acid | 2.70 |
| Oleyl acid phosphate | 1.30 |

[1] A flexible polyester resin made by condensing adipic acid and maleic anhydride with diethylene glycol in mole ratios of 2:1:3 and diluted to a 50% solution in styrene.

Thus, the invention provides a combination of lubricating additives which not only prevent breakage of articles when pulled through the forming means referred to by reducing friction, but in addition, the particular lubricating additives of the invention do not detrimentally affect the finished product by the formation of voids and surface defects as was experienced in the prior art.

What is claimed is:

1. In a resin composition adapted for use in the extraction of fiber reinforced resin articles, comprising a solution of 50–80% unsaturated polyester resin in 50–20% reactive unsaturated monomer, the improvement which comprises:

the addition of a lubrication composition comprising from 0.5–5 parts oleic acid and from 0.25–2.5 parts oleyl acid phosphate to said resin composition, said parts being parts by weight per 100 parts by weight of the resin composition said lubrication composition providing desired reduction of friction in the extraction of fiber reinforced resin articles without deleteriously affecting the extracted article.

2. The improvement of claim 1 wherein said parts of oleic acid and parts of oleyl acid phosphate in said lubrication composition are in a ratio of approximately 2:1.

References Cited

UNITED STATES PATENTS

| | | | |
|---|---|---|---|
| 2,587,477 | 2/1952 | Hunter | 260—30.6 |
| 2,976,259 | 3/1961 | Hardy et al. | 260—22 |
| 3,004,937 | 10/1961 | Van Nostrand et al. | 260—45.7 |
| 3,050,487 | 8/1962 | Solomon | 260—30.6 |
| 3,151,354 | 10/1964 | Boggs | 18—4 |

FOREIGN PATENTS 752,155   7/1956   Great Britain.

HOSEA E. TAYLOR, Jr., *Primary Examiner.*

R. W. GRIFFIN, *Assistant Examiner.*

U.S. Cl. X.R.

117—126, 167; 260—23, 30.6, 40, 41